Patented Nov. 14, 1933

1,934,707

UNITED STATES PATENT OFFICE 1,934,707

MANUFACTURE OF FERTILIZER

Herman L. Hartenstein, Chicago, Ill.

No Drawing. Application April 4, 1927
Serial No. 180,999

4 Claims. (Cl. 71—6)

This invention relates to the utilization of cornstalks, leaves, fodder and other crop and plant residues.

By means of this improved process such material may be profitably utilized to increase soil fertility, thereby enabling profitable crop production.

In carrying out this invention I prefer to use cut or shredded cornstalks, leaves, fodder, stover and other crop residues together with phosphorous, nitrogen and potash bearing materials or compounds like pulverized phosphate rock, nitrate of soda, nitrate of soda-potash, sulphur, pyrophoric and finely divided iron and water. The pyrophoric iron is not an ordinary commercial form of iron. It is a finer form of iron readily oxidizable according to its fineness or granular condition. While the pyrophoric iron alone does not constitute the present invention it does form a part of the invention in combination with the other fertilizer ingredients. The pyrophoric iron, however, does constitute a portion of the subject matter of my co-pending application, Serial No. 142,190.

The metallic iron consists of clean fine iron borings, etc., which are turned out by machine shops, and may be employed in lieu of the pyrophoric iron; such borings are rendered more active and suitable by first heating the same with special gases, with proper care, to avoid oxidation, however, this is not a part of the present invention.

The stalks, fodder and other plant residues are preferably cut, ground or shredded. The metals, minerals and other compounds may be previously mixed together, or separatly added, to the vegetable matter, considering of course the ratio of organic and mineral elements or compounds desired in the fertilizer.

The charge is preferably mixed in a container (or in a pile with netting or planks to keep it in position) and is saturated with water, preferably by spraying the water thereupon.

Dry stalks, leaves, straw, weeds, etc., will easily retain three times their weight of water.

Any of the ordinary means may be employed to prevent excessive packing or pressing during the treatment and to insure aeration.

At the end of a predetermined period of time, such for instance as a few days, a little more water should be added to keep the sides and top of the piles or stacks saturated, so as to absorb and prevent loss of gaseous products, and when finished, the drying is done by air or heat, and if desired the resulting product is ground and pulverized.

In the absence of a bin or container it is best to start with a pile of a moderate height (four or five feet), treat it, then at the expiration of two days or when the pile is apparently dry externally, apply water, if desired. Should there arise any excessive heating in the mass it should be agitated, stirred or turned and simultaneously sprayed with water and aerated. The duration of the process is usually two months, and additional time is in no manner harmful, provided the mass is covered and protected from the elements. An additional supply or charge may be added on top of the pile or mass, and then watered. It is understood that if any undesirable "sourness" of acid exists at this stage the same may be corrected by the addition of some alkaline or phosphorous bearing material.

As a rule the process is conducted, not on a farm, but on a commercial scale with bins, dens, containers, sheds and buildings, sulphur or pyrites burners, proper pipes and spraying nozzles to carry and distribute the air and water that may be introduced, together with buckets, cranes, elevators, equipment for charging, mixing, stirring, discharging and drying the product.

What is claimed as new is:—

1. The making of fertilizer which comprises cutting or shredding cornstalks, other plant residues and the like, mixing therewith pyrophoric iron, phosphate rock and water, and allowing the mixture to age in the presence of air and moisture.

2. The making of fertilizer which comprises cutting or shredding cornstalks, other plant residues and the like, mixing therewith pyrophoric iron, phosphate rock, sulphur, nitrate of soda and water, allowing the mixture to age in the presence of moisture.

3. The making of fertilizer which comprises cutting or shredding cornstalks, other plant residues and the like, mixing therewith pyrophoric iron, phosphate rock and water, allowing the mixture to age in the presence of air and moisture, then drying and pulverizing the resultant product.

4. The making of fertilizer which comprises cutting or shredding cornstalks, other plant residues and the like, mixing therewith pyrophoric iron, phosphate rock, sulphur, nitrate of soda and water, allowing the mixture to age in the presence of air and moisture, then drying and pulverizing the resultant product.

HERMAN L. HARTENSTEIN.